United States Patent Office.

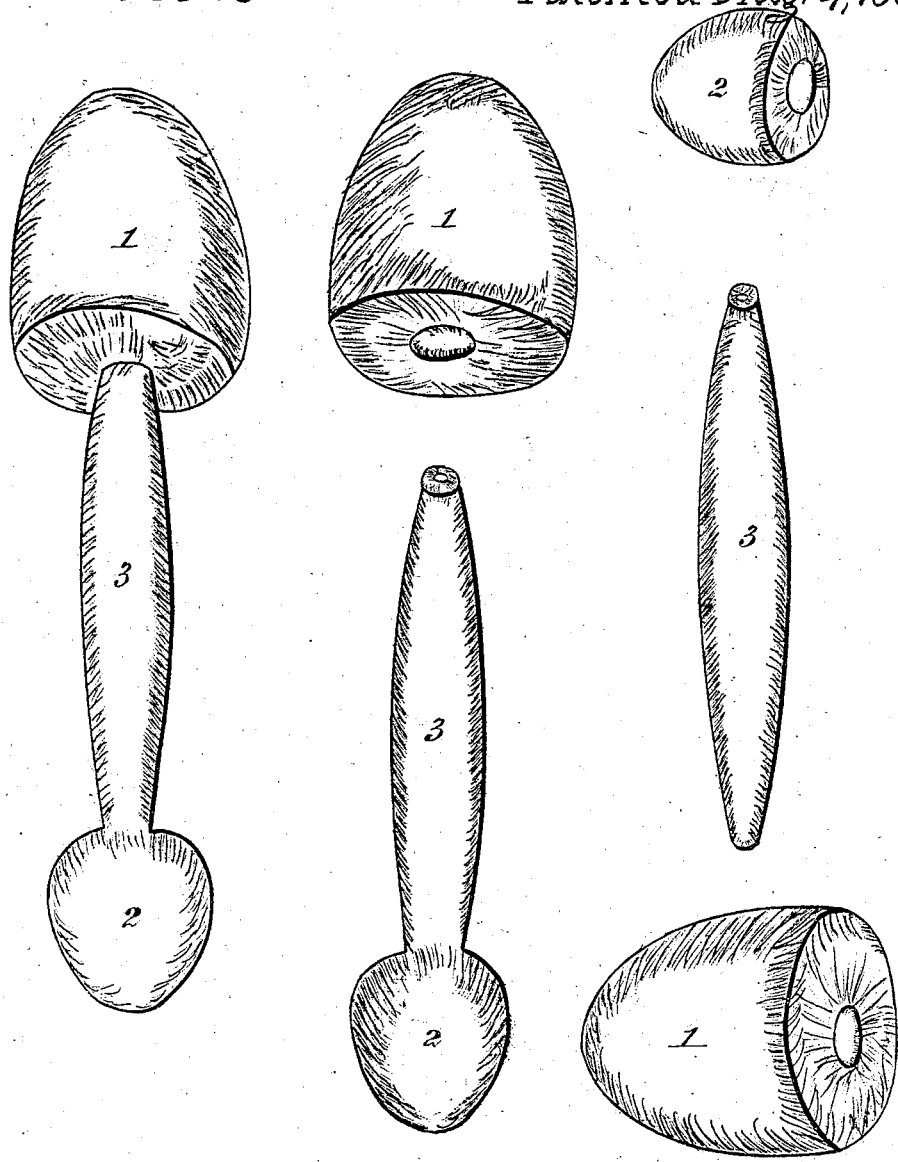

SIMEON R. BOLTON, OF PRESCOTT, WISCONSIN.

Letters Patent No. 80,588, dated August 4, 1868.

IMPROVEMENT IN STOCKING-DARNERS.

The Schedule referred to in these Letters Patent and making part of the same.

TO ALL WHOM IT MAY CONCERN:

Be it known that I, SIMEON R. BOLTON, of Prescott, in the county of Pierce, and State of Wisconsin, have invented a new and useful machine for the purpose of placing in stockings, mittens, or gloves, and drawing them tightly over it, so as to render them firm and smooth, that they may be darned or mended easily; reference being had to the accompanying drawings, which form a part of this specification.

My invention consists of two oval-shaped pieces of wood, marked $a$ and $b$, connected with a wooden handle or pin, marked $c$, as seen in Drawing No. 1. The piece marked $a$, being about twice the size of $b$, is used for large stockings or mittens; $b$ is used for children's or small stockings or mittens.

Figure 2 exhibits the parts detached from each other.

By detaching $b$ from the handle $c$, it (the handle $c$) is used for the purpose of putting the fingers of gloves so as to stretch them, so that they may be more easily darned. $a$ and $b$ are attached to the handle $c$ by boring holes in them of the size of the respective ends of the handle $c$. The small hole, marked $d$, in the larger end of the handle $c$, is used as a receptacle for needles. By dispensing with this receptacle, $a$ and $c$ may be made from one piece of timber, without being detached.

What I claim as my invention, and desire to secure by Letters Patent, is—

A stocking-tree, consisting of detachable heads and shaft, the heads being of different sizes, and the shaft provided with a cavity for use as a needle-case, all arranged substantially as herein described.

SIMEON R. BOLTON.

Witnesses:
C. W. WRIGHT,
H. DOE.